United States Patent
Carlsson et al.

(10) Patent No.: US 11,423,569 B1
(45) Date of Patent: Aug. 23, 2022

(54) GAZE-TRACKING SYSTEM AND METHOD EMPLOYING SELECTIVE GLINTS

(71) Applicant: Varjo Technologies Oy, Helsinki (FI)

(72) Inventors: Thomas Carlsson, Vantaa (FI); Ville Miettinen, Helsinki (FI); Oleksii Shtankevych, Espoo (FI); Tomi Lehto, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/226,493

(22) Filed: Apr. 9, 2021

(51) Int. Cl.
  *G06T 7/73* (2017.01)
  *G06F 3/01* (2006.01)
  *G06V 10/141* (2022.01)
  *G06V 40/19* (2022.01)

(52) U.S. Cl.
  CPC ............ *G06T 7/73* (2017.01); *G06F 3/013* (2013.01); *G06V 10/141* (2022.01); *G06V 40/19* (2022.01); *G06T 2207/30201* (2013.01)

(58) Field of Classification Search
  None
  See application file for complete search history.

(56) References Cited

U.S. PATENT DOCUMENTS

| | | | | |
|---|---|---|---|---|
| 2011/0034911 | A1* | 2/2011 | Bischoff | A61F 9/009 606/4 |
| 2015/0098620 | A1* | 4/2015 | Wu | G09G 3/003 382/103 |
| 2015/0313467 | A1* | 11/2015 | Sakai | A61B 3/1208 351/208 |
| 2018/0114288 | A1* | 4/2018 | Aldaz | A61B 5/6803 |
| 2020/0209958 | A1* | 7/2020 | Sztuk | G06F 3/017 |
| 2020/0326777 | A1* | 10/2020 | Shoushtari | G06T 19/006 |
| 2021/0160468 | A1* | 5/2021 | Peuhkurinen | H04N 9/3185 |

* cited by examiner

*Primary Examiner* — Talha M Nawaz
(74) *Attorney, Agent, or Firm* — Ziegler IP Law Group, LLC

(57) ABSTRACT

A gaze-tracking system for use in head-mounted display apparatus. The gaze-tracking system includes: illuminators; camera; and processor configured to: illuminate illuminators in sequential manner; control camera to capture eye images of user's eye during illumination of illuminators; identify reflection(s) of illuminator in eye image; determine extent of deformation in shape of reflection(s) with respect to shape of illuminator; determine extent of displacement in position of reflection(s) with respect to position of illuminator; compute user-specific score for illuminator based on extents of deformation and displacement; select illuminator(s) based on user-specific scores; illuminate illuminator(s); control camera to capture eye image of user's eye during illumination of illuminator(s); and detect gaze direction of user based upon relative position of pupil of user's eye with respect to reflections of illuminator(s) in eye image.

10 Claims, 6 Drawing Sheets

GAZE-TRACKING SYSTEM AND METHOD EMPLOYING SELECTIVE GLINTS

TECHNICAL FIELD

The present disclosure relates to gaze-tracking systems for use in head-mounted display apparatuses, said gaze-tracking systems employing selective glints. Moreover, the present disclosure relates to gaze-tracking methods employing selective glints. Furthermore, the present disclosure relates to display apparatuses incorporating said gaze-tracking systems.

BACKGROUND

In recent times, immersive technologies such as virtual-reality, augmented-reality, mixed-reality (collectively referred to as extended-reality (XR) technology) are being employed in various fields such as entertainment, real-estate, combat training, medical imaging operations, simulators, navigation, and the like. Notably, these immersive technologies are employed in display apparatuses to provide immersive XR environments to a user. The display apparatus may include a head-mounted device (HMD) at which images corresponding to the XR environment are displayed. In use, the user generally wears (namely, supports) the HMD on his/her head.

Typically, the HMD employs a gaze-tracking (namely, eye tracking) system to detect a gaze direction of the user. Typically, such a gaze-tracking system determines a position of pupils of the user's eyes, and subsequently monitors change in the position of the pupils. Generally, in the gaze-tracking system, several illuminators are employed for emitting light towards the user's eyes, and a camera is employed for capturing an image depicting the user's eyes and reflections of the emitted light from the user's eyes. Thereafter, the reflections of the emitted light are used as reference for determining the position of the pupils and the gaze direction of the user.

However, existing gaze-tracking systems are associated with several limitations. These gaze-tracking systems are generic in nature and are not optimized on a per-user basis. Firstly, while using the HMD, a portion of trackable features of the user's eyes are often obscured or occluded by reflections and glares from eyeglasses of the user, eyelids of the user (for example, when the user blinks or squints his/her eyes), eyelashes of the user, epicanthic folds of the user's eyes, and the like. In such an instance, some of the reflections are absent in the captured images of the user's eyes since some emitted light from illuminators is not reflected by an ocular surface of the user's eyes. Such absence of some reflections leads to inaccuracies in determining the gaze direction of the user. Secondly, the existing gaze-tracking systems often misinterpret visual artifacts (for example, reflections or glares of light emitted by displays or projectors of the HMD, false reflections of light from the eyeglasses of the user, false reflections of light from the ocular surface of the user's eyes, and the like) to be the reflections of the light emitted by the illuminators. In such a case, the gaze-tracking systems utilize such erroneous visual artifacts and determine an inaccurate gaze direction of the user. Moreover, in some existing gaze-tracking systems, said visual artifacts are introduced due to an off-axis placement of the camera as well as due to some manufacturing anomalies in mechanics and/or in optics of the HMD.

Therefore, in light of the foregoing discussion, there exists a need to overcome the aforementioned drawbacks associated with existing gaze-tracking systems.

SUMMARY

The present disclosure seeks to provide a gaze-tracking system for use in a head-mounted display apparatus, said gaze-tracking system employing selective glints. The present disclosure also seeks to provide a gaze-tracking method employing selective glints. Moreover, the present disclosure also seeks to provide a display apparatus incorporating said gaze-tracking system. An aim of the present disclosure is to provide a solution that overcomes at least partially the problems encountered in prior art.

In one aspect, an embodiment of the present disclosure provides a gaze-tracking system for use in a head-mounted display apparatus, the gaze-tracking system comprising:
a plurality of illuminators;
at least one camera; and
at least one processor configured to:
  illuminate the plurality of illuminators in a sequential manner, wherein a single illuminator is illuminated at a given instant of time;
  control the at least one camera to capture a plurality of eye images of a user's eye during illumination of respective illuminators;
  identify at least one reflection of a given illuminator that is visible in a corresponding eye image;
  determine an extent of deformation in a shape of the at least one reflection with respect to a shape of the given illuminator;
  determine an extent of displacement in a position of the at least one reflection relative to the user's eye as captured in the corresponding eye image with respect to a position of the given illuminator relative to the user's eye;
  compute a user-specific score for the given illuminator based on the extent of deformation and the extent of displacement;
  select at least one illuminator from amongst the plurality of illuminators based on user-specific scores computed for the plurality of illuminators;
  illuminate the at least one illuminator;
  control the at least one camera to capture an eye image of the user's eye during illumination of the at least one illuminator; and
  detect a gaze direction of the user based upon a relative position of a pupil of the user's eye with respect to reflections of the at least one illuminator in the eye image.

In another aspect, an embodiment of the present disclosure provides a gaze-tracking method comprising:
illuminating a plurality of illuminators in a sequential manner, wherein a single illuminator is illuminated at a given instant of time;
controlling at least one camera to capture a plurality of eye images of a user's eye during illumination of respective illuminators;
identifying at least one reflection of a given illuminator that is visible in a corresponding eye image;
determining an extent of deformation in a shape of the at least one reflection with respect to a shape of the given illuminator;
determining an extent of displacement in a position of the at least one reflection relative to the user's eye as captured in the corresponding eye image with respect to a position of the given illuminator relative to the user's eye;

computing a user-specific score for the given illuminator based on the extent of deformation and the extent of displacement;

selecting at least one illuminator from amongst the plurality of illuminators based on user-specific scores computed for the plurality of illuminators;

illuminating the at least one illuminator;

controlling the at least one camera to capture an eye image of the user's eye during illumination of the at least one illuminator; and detecting a gaze direction of the user based upon a relative position of a pupil of the user's eye with respect to reflections of the at least one illuminator in the eye image.

In yet another aspect, an embodiment of the present disclosure provides a display apparatus comprising:

at least one light source that is to be employed to display images to a user;

a plurality of illuminators;

at least one camera; and at least one processor configured to:

illuminate the plurality of illuminators in a sequential manner, wherein a single illuminator is illuminated at a given instant of time;

control the at least one camera to capture a plurality of eye images of a user's eye during illumination of respective illuminators;

identify at least one reflection of a given illuminator that is visible in a corresponding eye image;

determine an extent of deformation in a shape of the at least one reflection with respect to a shape of the given illuminator;

determine an extent of displacement in a position of the at least one reflection relative to the user's eye as captured in the corresponding eye image with respect to a position of the given illuminator relative to the user's eye;

compute a user-specific score for the given illuminator based on the extent of deformation and the extent of displacement;

select at least one illuminator from amongst the plurality of illuminators based on user-specific scores computed for the plurality of illuminators;

illuminate the at least one illuminator;

control the at least one camera to capture an eye image of the user's eye during illumination of the at least one illuminator; and detect a gaze direction of the user based upon a relative position of a pupil of the user's eye with respect to reflections of the at least one illuminator in the eye image.

Embodiments of the present disclosure substantially eliminate or at least partially address the aforementioned problems in the prior art, and enable accurate and reliable detection of gaze direction of the user by way of optimizing the gaze-tracking system on a user-specific basis.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
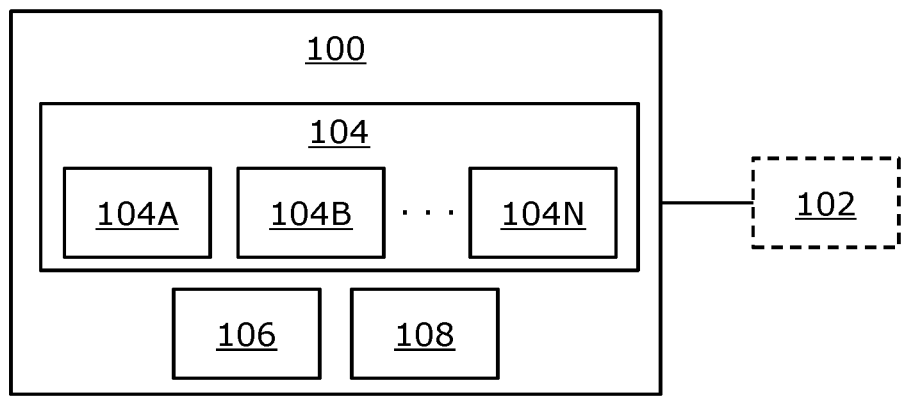
FIG. 1 illustrates a block diagram of architecture of a gaze-tracking system for use in a head-mounted display apparatus, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a gaze-tracking system for use in a head-mounted display apparatus, the gaze-tracking system comprising:
a plurality of illuminators;
at least one camera; and
at least one processor configured to:
  illuminate the plurality of illuminators in a sequential manner, wherein a single illuminator is illuminated at a given instant of time;
  control the at least one camera to capture a plurality of eye images of a user's eye during illumination of respective illuminators;
  identify at least one reflection of a given illuminator that is visible in a corresponding eye image;
  determine an extent of deformation in a shape of the at least one reflection with respect to a shape of the given illuminator;
  determine an extent of displacement in a position of the at least one reflection relative to the user's eye as captured in the corresponding eye image with respect to a position of the given illuminator relative to the user's eye;
  compute a user-specific score for the given illuminator based on the extent of deformation and the extent of displacement;
  select at least one illuminator from amongst the plurality of illuminators based on user-specific scores computed for the plurality of illuminators;
  illuminate the at least one illuminator;
  control the at least one camera to capture an eye image of the user's eye during illumination of the at least one illuminator; and
  detect a gaze direction of the user based upon a relative position of a pupil of the user's eye with respect to reflections of the at least one illuminator in the eye image.

In another aspect, an embodiment of the present disclosure provides a gaze-tracking method comprising:
  illuminating a plurality of illuminators in a sequential manner, wherein a single illuminator is illuminated at a given instant of time;
  controlling at least one camera to capture a plurality of eye images of a user's eye during illumination of respective illuminators;
  identifying at least one reflection of a given illuminator that is visible in a corresponding eye image;
  determining an extent of deformation in a shape of the at least one reflection with respect to a shape of the given illuminator;
  determining an extent of displacement in a position of the at least one reflection relative to the user's eye as captured in the corresponding eye image with respect to a position of the given illuminator relative to the user's eye;
  computing a user-specific score for the given illuminator based on the extent of deformation and the extent of displacement;
  selecting at least one illuminator from amongst the plurality of illuminators based on user-specific scores computed for the plurality of illuminators;
  illuminating the at least one illuminator;
  controlling the at least one camera to capture an eye image of the user's eye during illumination of the at least one illuminator; and
  detecting a gaze direction of the user based upon a relative position of a pupil of the user's eye with respect to reflections of the at least one illuminator in the eye image.

In yet another aspect, an embodiment of the present disclosure provides a display apparatus comprising:
at least one light source that is to be employed to display images to a user;
a plurality of illuminators;
at least one camera; and
at least one processor configured to:
  illuminate the plurality of illuminators in a sequential manner, wherein a single illuminator is illuminated at a given instant of time;
  control the at least one camera to capture a plurality of eye images of a user's eye during illumination of respective illuminators;
  identify at least one reflection of a given illuminator that is visible in a corresponding eye image;
  determine an extent of deformation in a shape of the at least one reflection with respect to a shape of the given illuminator;
  determine an extent of displacement in a position of the at least one reflection relative to the user's eye as captured in the corresponding eye image with respect to a position of the given illuminator relative to the user's eye;
  compute a user-specific score for the given illuminator based on the extent of deformation and the extent of displacement;
  select at least one illuminator from amongst the plurality of illuminators based on user-specific scores computed for the plurality of illuminators;
  illuminate the at least one illuminator;
  control the at least one camera to capture an eye image of the user's eye during illumination of the at least one illuminator; and
  detect a gaze direction of the user based upon a relative position of a pupil of the user's eye with respect to reflections of the at least one illuminator in the eye image.

The present disclosure provides the aforementioned gaze-tracking system, the aforementioned gaze-tracking method, and the aforementioned display apparatus. The gaze-tracking system utilizes at least one illuminator for emitting light to illuminate the user's eye. As a result, the reflections of the at least one illuminator in the eye image are utilized to accurately detect the gaze direction of the user. Said at least one illuminator is selected from amongst the plurality of illuminators, based on the user-specific scores computed for the plurality of illuminators. This allows for accurately utilizing only selective useful illuminator(s) from amongst the plurality of illuminators, in order to accurately identify corresponding useful reflections of such illuminator(s) in eye images for gaze tracking purposes. The (user-specific optimized) gaze-tracking system mitigates visual artifacts in the captured eye images by using selective illuminator(s) for illumination during gaze tracking, to detect a highly accurate gaze direction of the user. Advantageously, when utilizing only such selective illuminator(s), power consumption and thermal impact associated with use of the head-mounted display apparatus is minimal, thus facilitates in saving costs and energy. Beneficially, the gaze-tracking system can be utilized for accurately determining the gaze direction of the user even when the user's eye is partially occluded by its own features or by eyeglasses, and even without knowledge of eyeglass optics and other user-specific traits. Moreover, the gaze-tracking system can be easily used in various types of head-mounted display apparatuses without obstructing the user's view. The gaze-tracking method is fast, reliable and can be implemented with ease.

Throughout the present disclosure, the term "gaze-tracking system" refers to specialized equipment for tracking a gaze direction of the user. The gaze-tracking system detects and/or follows gaze of the user. The head-mounted display apparatus uses the gaze-tracking system for tracking the gaze direction of the user via non-invasive techniques. Beneficially, the gaze-tracking system is arranged (in the head-mounted display apparatus) in a manner that it does not cause any obstruction in the user's view. Moreover, an accurate tracking of the gaze direction facilitates the head-mounted display apparatus to closely implement gaze contingency when presenting an extended-reality (XR) environment to the user. It is to be understood that the gaze-tracking system may also be referred to as an "eye-tracker system", a "means for detecting a gaze direction", a "means for tracking a gaze direction", or a "gaze-tracking unit".

Throughout the present disclosure, the term "head-mounted display apparatus" refers to specialized equipment that is configured to present the XR environment to the user when said display apparatus in operation is worn by the user on his/her head. The head-mounted display apparatus is implemented, for example, as an XR headset, a pair of XR glasses, and the like, that is operable to display a visual scene of the XR environment to the user. The head-mounted display apparatus may also simply be referred to as "display apparatus" as it is head-mounted only in use. The term "extended-reality" encompasses virtual reality (VR), augmented reality (AR), mixed reality (MR), and the like.

It will be appreciated that the at least one processor is coupled to various components of the gaze-tracking system, and is configured to control the operation of the gaze-tracking system. Optionally, the at least one processor of the gaze-tracking system is implemented by way of at least one processor of the head-mounted display apparatus. Alternatively, optionally, the gaze-tracking system and the head-mounted display apparatus have separate processors.

Throughout the present disclosure, the term "illuminator" refers to equipment that, in operation, emits light. Examples of a given illuminator include, but are not limited to, a light-emitting diode, a projector, a display, a laser. Optionally, the plurality of illuminators emit light of an infrared wavelength or a near-infrared wavelength. The emitted light of the infrared wavelength or the near-infrared wavelength is invisible (or imperceptible) to the human eye, thereby, reducing unwanted distraction when such light is incident upon the user's eye. Alternatively, optionally, the plurality of illuminators emit light of a visible wavelength. Optionally, the plurality of illuminators are implemented by way of at least two of: infrared light-emitting diodes, infrared lasers, infrared light projectors, infrared light-emitting diode based displays, visible light-emitting diodes, visible light lasers, visible light projectors.

It will be appreciated that the at least one processor is configured to control the plurality of illuminators to emit light (namely, be illuminated) in the sequential manner. A given illuminator may be switched on to be illuminated, using a control signal, by the at least one processor. The sequential manner of illumination may be repeated as required. In an example, the plurality of illuminators may comprise 10 illuminators that are to be illuminated in the sequential manner, wherein a first illuminator is illuminated at an instant of time t1, a second illuminator is illuminated at an instant of time t2, a third illuminator is illuminated at an instant of time t3, and so on. Then the first illuminator may be illuminated again at an instant of time t11, the second illuminator may be illuminated again at an instant of time t12, the third illuminator may be illuminated at an instant of time t13, and so on.

During illumination of the user's eye by a given illuminator, light emitted by the given illuminator is reflected from the user's eye. Throughout the present disclosure, the term "camera" refers to equipment that is operable to detect and process the light reflected from the user's eye, so as to capture the plurality of eye images of the user's eye and reflections of the plurality of illuminators (during the illumination of the respective illuminators) from the user's eye. As an example, the at least one camera may capture 10 eye images of the user's eye during illumination of 10 illuminators, wherein one illuminator is illuminated at a given instant of time and one eye image is captured corresponding to the given instant of time. Examples of the at least one camera include, but are not limited to, a digital camera, a black-and-white camera, a Red-Green-Blue (RGB) camera, a Red-Green-Blue-Depth (RGB-D) camera, an infrared camera, a visible camera, a hyperspectral camera. In some implementations, when the plurality of illuminators emit light of the infrared wavelength, the infrared camera or the hyperspectral camera may be utilized for imaging. In other implementations, when the plurality of illuminators emit light of the visible wavelength, the visible camera or the hyperspectral camera may be utilized for imaging.

Optionally, prior to employing the gaze-tracking system for detecting the gaze direction of the user, the at least one processor is configured to: control the at least one camera to capture test images, and process the captured test images to detect whether or not the user's eye is in proximity of the head-mounted display apparatus. Notably, features (such as edges, corners, curves, reflections, blobs, ridges, and the like) of the user's eye would be visible in the captured test images only when there would be a proximity between the user's eye and the head-mounted display apparatus (being used by the user). Otherwise, such features would not be visible in the captured test images. When processing the captured test images, the at least one processor optionally employs at least one feature extraction algorithm (such as an edge-detection algorithm, a corner-detection algorithm, a blob-detection algorithm, a feature detector algorithm, and the like). Such feature extraction algorithms are well known in the art.

Additionally or alternatively, optionally, the at least one processor is configured to perform detection of the proximity between the user's eye and the head-mounted display apparatus by utilizing a depth camera. Optionally, in this regard, the at least one processor is configured to control the depth camera to capture at least one depth image of the user's eye. Optionally, the at least one processor is configured to process the at least one depth image for generating a depth map, wherein the depth map comprises information pertaining to the optical depth of the user's eye with respect to the head-mounted display apparatus. Optionally, the at least one depth image is a two-dimensional image or a three-dimensional image. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. The depth camera may be implemented as a camera of the head-mounted display apparatus.

Optionally, the features of the user's eye are utilized by the at least one processor to estimate an inter-pupillary distance (IPD) of the user, when an arrangement of the user's eye with respect to the head-mounted display apparatus stabilizes. When the user wears the head-mounted display apparatus, he/she generally keeps adjusting the head-mounted display apparatus on his/her head until a comfortable fit of the head-mounted display apparatus on the head is achieved. When the comfortable fit is achieved, the arrangement of the user's eye with respect to the head-mounted display apparatus stabilizes. It will be appreciated that an average IPD of humans is not constant, and substantially varies from person to person. Notably, the IPD of a given user substantially changes with physical development (namely, growth) of the given user. For example, an IPD of a child is substantially different from that of an adult. Furthermore, the average IPD also varies substantially among users in a same age group. For example, a middle-aged woman may have a lesser average IPD as compared to a middle aged-man.

Moreover, the IPD of the given user varies substantially with whether the given user is focusing at nearby objects or far-away objects within a real-world scene. IPD estimation facilitates in presenting user-specific optimized images to the user of the head-mounted display apparatus.

It will also be appreciated that the sequential illumination of the plurality of illuminators and capturing of the plurality of eye images are repeated as long as the user's eye does not appear to be stabilized with respect to the head-mounted display apparatus. In order to determine whether or not stability of the user's eye is achieved, the at least one processor is configured to compare corresponding features of the user's eye in the plurality of eye images captured in a complete duration of a sweep of the sequential illumination of the plurality of illuminators. When there is nil or minimal change in position and/or orientation of the corresponding features of the user's eye (in the plurality of eye images) for the complete duration of said sweep, the user's eye is determined to be stabilized with respect to the head-mounted display apparatus.

Optionally, the at least processor is configured to employ at least one image processing algorithm to identify the at least one reflection of the given illuminator that is visible in the corresponding eye image. Optionally, in this regard, the at least one image processing algorithm is at least one of: a local thresholding algorithm to detect shapes that are brighter than their immediate neighbourhood, a de-noising algorithm to remove noise in the corresponding eye image, a shape recognition algorithm, a pattern recognition algorithm. Other suitable image processing algorithms are also feasible to be employed by the at least one processor.

The at least one reflection of the given illuminator is from an ocular surface of the user's eye, a surface of eyeglasses worn by the user, a surface of contact lenses worn by the user, and the like. Reflection(s) of the given illuminator that have a shape, a position, and a rotational orientation corresponding to the given illuminator are formed as glints, which are required to be identified accurately for accurate gaze-tracking. However, some visual artifacts (such as glares caused by the given illuminator) may be formed as false reflections which may be a part of the at least one reflection of the given illuminator, in the corresponding eye image.

These visual artifacts are undesirable visual anomalies or visual imposters (obscuring trackable features of the user's eye) that are formed as the false reflections and are represented as the glares. The visual artifacts may also be caused by user's features (namely, traits) such as long eye lashes of the user, epicanthic folds of the user's eye, and the like, or by manufacturing inaccuracies in mechanics and/or optics of the head-mounted display apparatus. It will be appreciated that the processor is optionally configured to employ at least one data processing algorithm to map the at least one reflection that is visible in the corresponding eye image with a known shape of the given illuminator, to identify and discard the visual artifacts. Optionally, when mapping the at least one reflection with the known shape of the given illuminator, the at least one data processing algorithm matches the known shape of the given illuminator with all reflections that are visible in the corresponding eye image, identifies as visual artifacts those reflections which do not match with the known shape of the given illuminator, and discards such identified visual artifacts. The identification and discarding of the visual artifacts may optionally also be done using a known position, and a known rotational orientation corresponding to the given illuminator.

The extent of deformation in the shape of the at least one reflection with respect to the shape of the given illuminator is determined to detect whether or not the shape of the at least one reflection of the given illuminator is consistent with the shape of the given illuminator. Lesser the extent of deformation, greater is the consistency between the shape of the at least one reflection and the shape of the given illuminator, and vice versa. In other words, a low extent of deformation indicates that the shape of the at least one reflection is highly similar to an expected shape for the at least one reflection corresponding to the shape of the given illuminator. The low extent of deformation is indicative of low distortion (for example, minimal bending, minimal buckling, minimal twisting, and the like) in the shape of the at least one reflection. Optionally, the extent of deformation is measured in units of length, wherein the units of length are micrometres or millimetres. Alternatively, optionally, the extent of deformation is measured in pixel units (i.e., a number of pixels).

The extent of displacement in the position of the at least one reflection relative to the user's eye with respect to the position of the given illuminator relative to the user's eye is determined to detect whether or not the position of the at least one reflection is consistent with the position of the given illuminator. Lesser the extent of displacement, greater is the consistency between the position of the at least one reflection and the position of the given illuminator, relative to the user's eye, and vice versa. In other words, a low extent of displacement indicates that the position of the at least one reflection is highly close to an expected position of the at least one reflection corresponding to the position of the given illuminator relative to the user's eye. Optionally, the extent of displacement is measured in units of length, wherein the units of length are micrometres or millimetres. Alternatively, optionally, the extent of displacement is measured in pixel units (i.e., a number of pixels).

Optionally, the at least one processor is configured to determine an extent of occlusion of the pupil of the user's eye by the at least one reflection caused by the given illuminator, and compute the user-specific score for the given illuminator based also on the extent of occlusion. The extent of occlusion is determined to detect how much the at least one reflection occludes (namely, obscures) the pupil in the corresponding eye image. Lesser the extent of occlusion, lesser is the occlusion of the pupil by the at least one reflection in the corresponding eye image, and vice versa. As mentioned earlier, the at least one reflection could include both glints as well as visual artifacts. A less extent of occlusion corresponds to a high visibility of the pupil in the corresponding eye image, which is desirable as the pupil is a trackable feature of the user's eye. The less extent of occlusion indicates that the given illuminator beneficially forms nil or less-occluding visual artifacts, that do not adversely impact tracking of the pupil. Optionally, the extent of occlusion is measured in units of length, wherein the units of length are micrometres or millimetres. Alternatively, optionally, the extent of occlusion is measured in pixel units (i.e., a number of pixels).

Optionally, the plurality of illuminators are arranged around a periphery of an exit optical element of the head-mounted display apparatus. In such a case, the plurality of illuminators are arranged to physically surround the exit optical element. It will be appreciated that an optical path of the light emitted by said arrangement of the plurality of illuminators is unobstructed by other components of the head-mounted display apparatus, and is therefore directly incident upon the user's eye. Herein, the term "exit optical element" refers to an optical component that is configured to direct a projection of the visual scene towards the user's eye, when the head-mounted display apparatus, in operation, is worn by the user. Notably, the exit optical element is the component that is closest to the user's eye in the head-mounted display apparatus. Therefore, the term "exit optical element" may also be commonly referred to as an "eyepiece". Furthermore, optionally, the exit optical element is implemented by way of at least one of: a convex lens, a plano-convex lens, a Liquid Crystal (LC) lens, a liquid lens, a Fresnel lens, aspherical lens, achromatic lens. Other suitable examples for implementing the exit optical element are also feasible.

Throughout the present disclosure, the term "user-specific score" for a given illuminator refers to a score indicative of an amount of error produced by the given illuminator due to visual artifacts (such as glares, false reflections, and the like) caused by the given illuminator for a given user using the head-mounted display apparatus, during a given viewing session. Lesser the amount of error produced by the given illuminator, greater is the user-specific score for the given illuminator, and vice versa. Optionally, the user-specific score is a function of at least the extent of deformation and the extent of displacement. Additionally, optionally, the user-specific score is a function of the extent of occlusion. It will be appreciated that lesser the extent of deformation and lesser the extent of displacement, greater is the user-specific score for the given illuminator. This is attributed to the fact that a low extent of deformation and a low extent of displacement for a reflection of the given illuminator indicates a high degree of accuracy (and consequently, a low amount of error) produced by the given illuminator. Moreover, optionally, lesser the extent of occlusion, greater is the user-specific score for the given illuminator. The less extent of occlusion indicates the given illuminator beneficially forms nil or less-occluding visual artifacts, and therefore has a high degree of accuracy. Optionally, the user-specific score for the given illuminator is directly related to a cost-benefit ratio of the given illuminator. Optionally, the at least one processor employs at least one mathematical formula for computing the user-specific score for the given illuminator based at least on the extent of deformation and the extent of displacement.

Optionally, in the at least one mathematical formula, the user-specific score is inversely related to the extent of deformation and the extent of displacement. Moreover, optionally, at least one mathematical formula computes the user-specific score for the given illuminator based also on the extent of occlusion, wherein the user-specific score is inversely related to the extent of occlusion. The at least one mathematical formula may be employed in at least one pseudocode.

An exemplary pseudocode for computing the user-specific score is provided as follows:

```
// Calculate weighting for each horizontal x-coordinate for both eyes
// find minimum and maximum X coordinate for each pixel inside eye outline
// Using, for example, standard gaussian function for calculating weights
// For gaussian mean value, using, for example, pupil position x-coordinate to get symmetrical weighting around pupil. Sigma value here can be found empirically to produce good compromise between reflections close to pupil and further away
    mean=pupilX
    sigma=(maxX−minX)*(1.0/6.0)
    eye_weights[eye]=gaussian(minX, maxX, mean, sigma)
// Gaussian weight function
gaussian(x1, x2, mean, sigma)
    one_over_two_sigma2=0.5/sigma^2
    for x between x1 and x2
    x_offset=x−mean
    weights[x]=max(0.0, e^(−x_offset^2*one_over_two_sigma2))
    return weights
// Calculate reference images. Constants here are empirical
local_leak_scale=1.0
local_leak_offset=6
chamber_leak_scale=1.2
chamber_leak_offset=9
for both eyes
    for each pixel in eye image
    local_leak_ref[x, y]=find_third_highest_pixel_value_from_glint_images(eye, x, y)*local_leak_scale+local_leak_offset
    chamber_leak_ref[x, y]=
find_second_highest_pixel_value_from_glint_images(other_eye(eye), x, y) chamber_leak_scale+chamber_leak_offset
// Calculate cross chamber leaks for both eyes
    for each eye image
    sum=0
    count=0
    for each pixel in eye image that is inside eye outline
        leak=max(input_img[x, y]−chamber_leak_ref[x, y], 0)
        sum=leak^2*weights[eye][x]
        count+=1
    chamber_leak[eye][glint]=sqrt(sum/count)
// Normalize chamber leak values by subtracting the smallest one.
// This step aims to remove any background noise in the data.
min_chamber_leak=0
for both eyes
    for each eye image
    min_chamber_leak=min(min_chamber_leak, chamber_leak[eye][glint])
for both eyes
    for each eye image
    chamber_leak[eye][glint]−=min_chamber_leak
// Calculate local leaks for both eyes
    for each eye image
    // Compute histogram of pixel deltas
    int histogram[256]=0
    for each pixel in eye image that is inside eye outline
        leak=max(input_img[x, y]−local_leak_ref[x, y], 0)
        histogram[round(leak*weights[eye][x])]+=1
```

```
// Remove highest values from histogram that are
    expected to be caused by primary glint reflection of
    current image. Values are empirical.
if (is_glint_shape(eye, glint)=='V') then
    expected_glint_coverage=0.00030
else
    expected_glint_coverage=0.00012
values_to_remove=total_pixel_count*expected_glint_
    coverage
removed=0
for i=255 to 0
    if histogram[i]+removed>=values_to_remove then
        histogram[i]-=values_to_remove-removed
        break
    removed+=histogram[i]
    histogram[i]=0
// Compute local leak from histogram. pow_scale is
    empirical
pow_scale=0.6
sum=0
for i=1 to 255
    sum+=histogram[i]*(i^pow_scale)
    local_leak[eye][glint]=(sum/count(histogram))^(1.0/
        pow_scale)
// Compute goodness value for each image combining
chamber and local values.
// This allows us to use just single number when evaluating
whether to keep or drop a given illuminator.
chamber_leak_weight=1.0
local_leak_weight=10.0
for both eyes
    for each eye image
        weighted_leaks=local_leak[eye][glint]*local_leak_
            weight+chamber_leak[eye][glint]*chamber_leak_
            weight
        goodness[eye][glint]=e^-weighted_leaks
// Weight each illuminator also separately, by computing its
user-specific score (i.e., weighted goodness). Depending on
their placement different illuminators cause different kind of
reflections, and therefore, are considered separately. Also
gaze tracking has some preference as to which illuminators
should be selected, based on user-specific scores.
for both eyes
    for each eye image
        weighted_goodness[eye][glint]=goodness[eye][glint]*
            glint_weight[eye][glint]
// Adjust weighted_goodness range (i.e., a range of the
user-specific score) using a median value so that illumina-
tors with negative weighted_goodness are considered as
bad, whereas illuminators with positive weighted_goodness
are considered as good. valuation_cut_off is empirical.
valuation_cut_off=0.8
for both eyes
    cut_off=median(weighted_goodness[eye])*valuation_
        cut_off
    for each eye image
        weighted_goodness[eye][glint]-=cut_off
// Eye image evaluation is now complete. Weighted good-
ness values are user-specific scores, which are now used to
select, which illuminator(s) should be enabled and which
disabled. Hardware and gaze tracking induce a set of limi-
tations for how many illuminator(s) can be enabled at the
same time and which illuminator(s) can be enabled at the
same time. Based on these rules and evaluated glint weights,
best possible combination of the at least one illuminator is
selected from amongst the plurality of illuminators.
// Pseudocode ends
```

Optionally, the user-specific score for the given illumina-tor lies in a range of 0 to 1. Here, 0 indicates lowest user-specific score (or worst user-specific score), while 1 indicates highest user-specific score (or perfect user-specific score). For example, the user-specific score for the given illuminator may be from 0, 0.1, 0.2, 0.3, 0.4, 0.5, 0.6, 0.7, 0.8 or 0.9 up to 0.1, 0.2, 0.3, 0.4, 0.5, 0.6, 0.7, 0.8, 0.9 or 1. Alternatively, optionally, the user-specific score for the given illuminator lies in a range of −1 to 1. Here, −1 indicates lowest user-specific score (or worst user-specific score), while 1 indicates highest user-specific score (or perfect user-specific score). For example, the user-specific score for the given illuminator may be from −1, −0.9, −0.8, −0.7, −0.6, −0.5, −0.4, −0.3, −0.2, −0.1, 0, 0.1, 0.2, 0.3, 0.4, 0.5, 0.6, 0.7, 0.8 or 0.9 up to −0.9, −0.8, −0.7, −0.6, −0.5, −0.4, −0.3, −0.2, −0.1, 0, 0.1, 0.2, 0.3, 0.4, 0.5, 0.6, 0.7, 0.8, 0.9 or 1. Yet alternatively, optionally, the user-specific score for the given illuminator lies in a range of 0 to 100. Here, 0 indicates lowest user-specific score, while 100 indicates highest user-specific score. For example, the user-specific score for the given illuminator may be from 0, 10, 20, 30, 40, 50, 60, 70, 80, or 90 up to 10, 20, 30, 40, 50, 60, 70, 80, 90 or 100. Other suitable ranges of the user-specific score for the given illuminator are also feasible.

It will be appreciated that when selecting at least one illuminator from amongst the plurality of illuminators based on the user-specific scores, the at least one processor is configured to: sort the user-specific scores computed for the plurality of illuminators in a descending order, and select the at least one illuminator corresponding to top at least one user-specific score from amongst the sorted user-specific scores. When only one illuminator is selected from amongst the plurality of illuminators, said illuminator has a highest user-specific score from amongst the user-specific scores computed for the plurality of illuminators. Theoretically, a given illuminator could have fairly large dimensions as well as a shape that could overlap physically with another illuminator (such as a large cross (X) sign formed by two V-shaped illuminators). Therefore, even a single useful illuminator having a high user-specific score enables accurate gaze-tracking. When multiple illuminators (namely, more than one illuminator) are selected from amongst the plurality of illuminators, the illuminators having top highest user-specific scores are prioritized over illuminator(s) having a low user-specific scores for said selection. In other words, the given illuminator having a highest user-specific score is selected as a first illuminator, a given illuminator having a second-highest user-specific score is selected as a second illuminator, a given illuminator having a third-highest user-specific score is selected as a third illuminator, and so on. In a first example, the user-specific scores computed for 8 illuminators I1, I2, I3, I4, I5, I6, I7, and I8 may be 0.65, 0.25, 0.50, 0.95, 0.35, 0.82, 0.75, and 0.10, respectively. Herein, 4 illuminators I4, I6, I7, and I1 are selected based on top four user-specific scores (namely, 0.95, 0.82, 0.75, and 0.65).

It will be appreciated that the selection of the at least one illuminator from amongst the plurality of illuminators is performed for the user each time that the head-mounted display apparatus is used by the user for a given viewing session. Only the at least one illuminator that is selected for the given viewing session, is utilized for an entire duration of the given viewing session. When the head-mounted display apparatus is removed by the user from his/her head and is worn again by the user on his/her head, the selection of the at least one illuminator is performed again as removal of the head-mounted display apparatus could affect eyeglass angle or eye-position of the user. Moreover, the selection of the at least one illuminator is also repeated when the head-mounted display apparatus has shifted (for example, due to a sudden jerk, movement of the user, and the like) on the user's head.

Optionally, in a practical implementation, the at least one processor is configured to determine a glint latency sync between the head-mounted display apparatus and a computing device (such as a computer) associated with the head-mounted display apparatus. Optionally, a glint latency is determined in terms of a number of milliseconds elapsed from a glint control command being issued or an eye image being captured to identify the at least one reflection of the given illuminator, to the eye image being available on the computing device. As an example, when glint latency square wave signals are not detected accurately within 50 eye images, the glint latency sync may fail. Once the glint latency sync is successful, the at least one illuminator is selected from amongst the plurality of illuminators. Said selection may fail when the user's eye (in particular, a pupil of the user's eye) is not detected for a given duration such as for example, 200 millisecond. Once the at least one illuminator is selected from amongst the plurality of illuminators, the user's IPD is optionally determined automatically. IPD determination may be skipped if this functionality is disabled (for example, by the user). Typically, the head-mounted display apparatus is calibrated using a crosshair jig which allows to map an optical axis of a lens of the head-mounted display apparatuses against a position in the at least one camera. This is known as "optical sweet spot" towards which chambers are driven. Optionally, separate chambers for a left eye and a right eye of the user are formed in the head-mounted display apparatus. When the user's IPD in the eye images appear to be wider than two sweet spot distances, the chambers have to be driven outwards, and vice versa, until a predefined threshold (such as 0.5 millimetres) of the IPD is attained. Optionally, the head-mounted display apparatuses has a motor to control position of the chamber, which allows to automatically match the user's IPD. Optionally, when the position of the chamber is changed, the at least one illuminator is selected again from amongst the plurality of illuminators. Optionally, the at least one processor is configured to calibrate the gaze-tracking system. Such calibration of the gaze-tracking system is generally known in the art.

The selected at least one illuminator is illuminated and is then employed to detect the gaze direction of the user. The at least one processor is configured to control the selected at least one illuminator to emit the light (or be illuminated). The selected at least one illuminator may be switched on to be illuminated, using a control signal, by the at least one processor. In some implementations, a single illuminator is illuminated, whereas in other implementations, more than one illuminator is illuminated. When there is more than one illuminator to be illuminated, the more than one illuminators are illuminated simultaneously, and then are employed to detect the gaze direction of the user. Referring to the first example, the selected 4 illuminators I1, I4, I6, and I7 are illuminated simultaneously, and are employed to detect the gaze direction of the user.

Optionally, the at least one camera initially captures the plurality of eye images of the user's eye during illumination of respective illuminators with high brightness and intensity for achieving requisite visual clarity in the plurality of eye images. This enables in accurate detection (and discarding) of the visual artifacts. It will be appreciated that for the given viewing session, once the at least one illuminator is selected from amongst the plurality of illuminators, a requirement of brightness and intensity in subsequent eye images captured for gaze-tracking is minimal. Optionally, in this regard, the at least one processor reduces an amount of current supplied to the at least one illuminator to reduce a brightness level of the at least one illuminator. Beneficially, in such a case, power consumption and/or thermal impact would be minimal due to the reduced current usage. Moreover, the power consumption and/or the thermal impact would automatically reduce when a number of illuminator(s) used for gaze tracking and required brightness levels of such illuminator(s) reduce. Beneficially, when the brightness levels of the at least one illuminators decrease, the visual artifacts such as glares, false reflections, and the like, caused by such illuminators are mitigated.

The at least processor controls the at least one camera to capture the eye image of the user's eye during illumination of the at least one illuminator. The eye image captured during the illumination of the at least one illuminator represents the (useful) reflections of the at least one illuminator from the ocular surface of the user's eye, the surface of eyeglasses worn by the user, the surface of contact lenses worn by the user, and the like. Notably, the reflections of the at least one illuminator in the eye image act as a frame of reference against which the relative position of the pupil is calculated to determine the gaze direction of the user. The at least one processor utilizes knowledge of geometry between the reflections of the at least one illuminator, the at least one illuminator and the at least one camera to accurately determine the relative position of the pupil of the user's eye with respect to said reflections. As the pupil of the user's eye is oriented along the gaze direction of the user, the determined relative position of the pupil with respect to said reflections enables the at least one processor to correctly discern the gaze direction of the user. As an example, the relative position of the pupil of the user's eye with respect to the reflections of the at least one illuminator in the eye image may be towards left of the reflections, thereby indicating that the gaze direction of the user is towards a right direction (or a right portion of the visual scene). The gaze direction of the user is detected continuously while the user views the images displayed via the at least one light source, and the gaze direction of the user is beneficially optionally utilized by the at least one processor during generation of the images to be displayed. It will be appreciated that employing the reflections of the at least one illuminator that correspond to useful glints allows for enhancing an accuracy of the detected gaze direction of the user, since this ensures that the visual artifacts are considerably mitigated and the at least one processor utilizes useful reflections (glints) of the at least one illuminator whilst detecting the gaze direction of the user. Gaze tracking using the reflections of the at least one illuminator also ensures that trackable features of the user's eye are not obscured with visual artifacts, and the gaze direction of the user can be determined accurately and time-efficiently.

Optionally, the gaze-tracking system further comprises at least one optical element that is transparent for visible light, but is reflective for infrared or near-infrared light, wherein the at least one optical element is positioned on an optical path between the at least one light source of the head-mounted display apparatus and the exit optical element, and wherein light corresponding to the reflections of the plurality of illuminators, when incident upon the at least one optical element, is reflected towards the at least one camera. Herein, the term "at least one optical element" refers to at least one optical component having optical properties such that the at least one optical component is transparent for visible light, but is reflective for infrared or near-infrared light. Notably, the at least one optical element allows the visible light emanating from the at least one light source to pass therethrough towards the exit optical element. Furthermore, the at least one optical element reflects the reflections of the plurality of illuminators from the user's eye towards the at least one camera. By adjusting the optical path of the reflections of the plurality of illuminators, the at least one optical element allows the at least one camera to capture the plurality of eye images of the user's eye even when the at least one camera is not directly arranged in front of the user's eye. As a result, the at least one camera can be compactly arranged in any suitable space within the head-mounted display apparatus, and need not necessarily face the user's eye. It will be appreciated that use of the at least one optical element also allows for reducing unwanted visible light from being captured by the at least one camera. Optionally, the at least one optical element is implemented by way of at least one of: a semi-transparent mirror, a semi-transparent film, a prism, a polarizer, an optical waveguide.

Throughout the present disclosure, the term "light source" refers to an element that is to be employed to display the images to the user. Optionally, the at least one light source is implemented as at least one display. In this regard, a given image is displayed at the at least one display. Examples of the at least one display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, the at least one light source is implemented as at least one projector. In this regard, a given image is projected onto a projection screen or directly onto a retina of the user's eyes. Examples of the at least one projector include, but are not limited to, an LCD-based projector, an LED-based projector, an OLED-based projector, an LCoS-based projector, a Digital Light Processing (DLP)-based projector, and a laser projector.

Optionally, the plurality of illuminators are non-circular in shape, and wherein the at least one processor is configured to:
  determine an extent of angular displacement in a rotational orientation of the at least one reflection with respect to a rotational orientation of the given illuminator; and
  compute the user-specific score for the given illuminator based on the extent of angular displacement.

Optionally, a given illuminator has a shape that is symmetrical about only one axis and that has rotational uniqueness about 360 degrees. In other words, a shape of the given illuminator is symmetrical about only one axis and such shape only repeats when said illuminator is rotated through 360 degrees. This allows for a given reflection of the given illuminator (which is a non-circular shaped illuminator) to be rotatably discernible to correspond to the given illuminator, based upon a rotational orientation of the given reflection. It will be appreciated that the at least one reflection of the plurality of illuminators is symmetrical about only one axis. In reality, the shape of the at least one reflection not only depends on the shape of its corresponding illuminator, but also on a curvature of a surface of the user's eye from where the at least one reflection occurred.

Optionally, the shape of the given illuminator is selected from a group consisting of A, V and Y. Alternatively, optionally, the shape of the given illuminator is selected from a group consisting of B, C, D, E, M, T, U and W. It will be appreciated that the shape of the given illuminator need not necessarily be an alphabetic character, but could also be a number or a pattern that is symmetrical about only one axis and that has rotational uniqueness about 360 degrees. As an example, the given illuminator may be V-shaped. In such a case, the V-shape of the given illuminator is symmetrical about only one axis, and has rotational uniqueness about 360 degrees. As a result, the reflection of said given illuminator can be accurately recognized even upon a change of the rotational orientation of the given illuminator (namely, upon rotation of the given illuminator). For example, when the given illuminator has the rotational orientation of 0 degrees, the at least one reflection of the given illuminator may be represented as ">". When the given illuminator has the rotational orientation of 90 degrees (when the given illuminator is rotated through 90 degrees in clockwise direction), the at least one reflection of the given illuminator may be represented as "V". Similarly, when the given illuminator has the rotational orientation of 180 degrees and 270 degrees (in clockwise direction), the at least one reflection of the given illuminator may be represented as "<" and "A", respectively. Furthermore, when the given illuminator has rotational orientation of 360 degrees, the at least one reflection of the given illuminator is represented as ">" which is similar to the original shape of the at least one reflection at 0 degrees. Here, the "rotational orientation" of the given illuminator that is V-shaped, refers to a direction where a tip of the V shape of the given illuminator is pointing, and a position of the given illuminator refers to an angle [0, 360] where the given non-circular light source is positioned on a circular rim of the exit optical elements, as measured from a centre of said circular rim.

Optionally, at least two of the plurality of illuminators have different non-circular shapes. In such a case, reflections of the at least two illuminators form a pattern of the different non-circular shapes in the corresponding eye images. Such a pattern of the different non-circular shapes is also useful in differentiating useful glints from the visual artifacts. As an example, the gaze-tracking system may comprise 6 illuminators, wherein 4 of the 6 illuminators are V-shaped, 1 illuminators is A-shaped, and 1 illuminators is Y-shaped. Optionally, the at least two of the plurality of illuminators have the same non-circular shape, but have different rotational orientations. In such a case, reflections of such at least two illuminators also have the same non-circular shape at the different rotational orientations. Therefore, using the corresponding eye images, said at least two illuminators corresponding to the reflections having the same non-circular shape but the different rotational orientations can be easily identified, to differentiate useful glints from visual artifacts.

Optionally, the extent of angular displacement in the rotational orientation of the at least one reflection with respect to the rotational orientation of the given illuminator is determined to detect whether or not the rotational orientation of the at least one reflection is consistent with the rotational orientation of the given illuminator. Lesser the extent of angular displacement, greater is the consistency between the rotational orientation of the at least one reflection and the rotational orientation of the given illuminator. Optionally, the user-specific score is a function of the extent of angular displacement. Optionally, the at least one processor employs the at least one mathematical formula for computing the user-specific score for the given illuminator based on the extent of angular displacement. Optionally, in the at least one mathematical formula, the user-specific score is inversely related to the extent of angular displacement. It will be appreciated that lesser the extent of angular displacement, greater is the user-specific score for the given illuminator. This is attributed to the fact that a low extent of angular displacement indicates a low amount of error produced by the given illuminator. Optionally, the extent of angular displacement is measured in degrees or radians. In an example, the extent of angular displacement for 8 illuminators J1, J2, J3, J4, J5, J6, J7, and J8 may be 25, 32, 14, 45, 35, 5, 20, and 10 degrees, respectively. The user-specific scores computed for the 8 illuminators J1, J2, J3, J4, J5, J6, J7, and J8 may be 60, 55, 75, 35, 42, 95, 68, and 90, respectively. Herein, 4 illuminators J6, J8, J3, and J7 are selected based on top four user-specific scores (namely, 95, 90, 75, and 68).

Optionally, at least one of the plurality of illuminators is circular in shape, wherein a given illuminator has a circular shape that may be either solid or hollow. Moreover, such an illuminator does not have distinct rotational orientations. As an example, the gaze-tracking system may comprise 7 illuminators that are non-circular in shape and 3 illuminators that are circular in shape.

Optionally, the plurality of illuminators are arranged along a circular arc, the at least one illuminator comprising more than one illuminator, and wherein the reflections of the at least one illuminator are arranged along a circular arc. The arrangement of the reflections of the at least one illuminator corresponds to the arrangement of the plurality of illuminators. It will be appreciated that in such an arrangement, the reflections of the at least one illuminator enables the at least one processor to easily and accurately distinguish useful reflections (i.e. glints) of the at least one illuminator from the visual artifacts. It will be appreciated that the term "circular arc" encompasses all types of curved arcs that belong to circular curves, as well as to non-circular curves. Therefore, the term "circular arc" also encompasses arcs such as an elliptical arc, a parabolic arc, a hyperbolic arc, and the like. Optionally, the circular arc along which the reflections of the at least one illuminator are arranged is similar to the circular arc along which the plurality of illuminators are arranged. Optionally, the plurality of illuminators are arranged in a predefined form, the at least one illuminator comprising more than one illuminator, and wherein the reflections of the at least one illuminator are arranged in the predefined form. Such a predefined form could comprise a specific alphabetic character, a specific numeric character, a specific pattern, and the like.

Optionally, the at least one processor is configured to:
identify a polygon defined by the reflections of the at least one illuminator; and
determine the relative position of the user's pupil with respect to the polygon.

Optionally, in this regard, vertices of the polygon correspond to at least three of the reflections of the at least one illuminator, the at least one illuminator comprising more than two illuminators. Optionally, the polygon is defined around the pupil of the user's eye. It will be appreciated that the polygon acts a frame of reference with well-defined limits for accurately determining the relative position of the user's pupil with respect to the reflections of the at least one illuminator, and subsequently, for accurately detecting the gaze direction of the user. Notably, the user's pupil may lie at a centre of the polygon, towards a particular region of the polygon, or along a periphery of the polygon. Furthermore, the user's pupil may or may not be fully enclosed by the polygon. As an example, when reflections of 4 illuminators appear in the eye image as 4 glints, the at least one processor may identify a quadrilateral defined by the 4 glints. In such an example, the user's pupil may be determined to lie at a centre of the quadrilateral, thereby indicating that the gaze direction of the user is towards a central region of the visual scene. As another example, when reflections of 6 illuminators appear in the eye image as 6 glints, the at least one processor may identify a hexagon defined by the 6 glints. In such an example, the user's pupil may be determined to lie at a right side region of the hexagon, thereby indicating that the gaze direction of the user is towards a left side region of the visual scene.

Moreover, the present disclosure also relates to the gaze-tracking method as described above. Various embodiments and variants disclosed above, with respect to the aforementioned first aspect, apply mutatis mutandis to the gaze-tracking method.

Optionally, when the plurality of illuminators are non-circular in shape, the gaze-tracking method further comprises determining an extent of angular displacement in a rotational orientation of the at least one reflection with respect to a rotational orientation of the given illuminator, wherein the step of computing the user-specific score for the given illuminator is performed based on the extent of angular displacement.

Optionally, in the gaze-tracking method, the plurality of illuminators are arranged along a circular arc, the at least one illuminator comprising more than one illuminator, and wherein the reflections of the at least one illuminator are arranged along a circular arc.

Optionally, the gaze-tracking method further comprises:
identifying a polygon defined by the reflections of the at least one illuminator; and
determining the relative position of the user's pupil with respect to the polygon.

Optionally, the gaze-tracking method further comprises determining an extent of occlusion of the pupil of the user's eye by the at least one reflection caused by the given illuminator, and computing the user-specific score for the given illuminator based also on the extent of occlusion.

Furthermore, the present disclosure also relates to the display apparatus as described above. Various embodiments and variants disclosed above, with respect to the aforementioned first aspect and the aforementioned second aspect, apply mutatis mutandis to the display apparatus.

Optionally, in the display apparatus, the plurality of illuminators are non-circular in shape, and wherein the at least one processor is configured to:
determine an extent of angular displacement in a rotational orientation of the at least one reflection with respect to a rotational orientation of the given illuminator; and
compute the user-specific score for the given illuminator based on the extent of angular displacement.

Optionally, in the display apparatus, the plurality of illuminators are arranged along a circular arc, the at least one illuminator comprising more than one illuminator, and wherein the reflections of the at least one illuminator are arranged along a circular arc.

Optionally, in the display apparatus, the at least one processor is configured to:
identify a polygon defined by the reflections of the at least one illuminator; and
determine the relative position of the user's pupil with respect to the polygon.

Optionally, in the display apparatus, the at least one processor is configured to determine an extent of occlusion of the pupil of the user's eye by the at least one reflection caused by the given illuminator, and compute the user-specific score for the given illuminator based also on the extent of occlusion.

Optionally, the display apparatus further comprises an exit optical element, wherein the plurality of illuminators are arranged around a periphery of the exit optical element.

DETAILED DESCRIPTION OF THE DRAWINGS

Referring to FIG. 1, illustrated is a block diagram of architecture of a gaze-tracking system 100 for use in a head-mounted display apparatus 102, in accordance with an embodiment of the present disclosure. The gaze-tracking system 100 comprises a plurality of illuminators (depicted as illuminators 104A, 104B, . . . , 104N, which are hereinafter collectively referenced as 104 for sake of convenience only), at least one camera (depicted as a camera 106) and at least one processor (depicted as a processor 108). The processor 108 is communicably coupled to the plurality of illuminators 104 and the camera 106.

Figure 2:
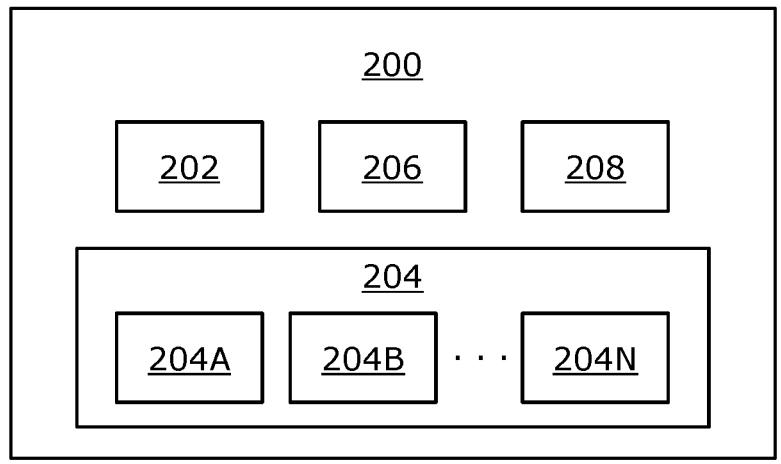
FIG. 2 illustrates a block diagram of architecture of a display apparatus, in accordance with an embodiment of the present disclosure.

Referring to FIG. 2, illustrated is a block diagram of architecture of a display apparatus 200, in accordance with an embodiment of the present disclosure. The display apparatus 200 comprises at least one light source (depicted as a light source 202) that is to be employed to display images to a user, a plurality of illuminators (depicted as illuminators 204A, 204B, . . . , 204N, which are hereinafter collectively referenced as 204 for sake of convenience only), at least one camera (depicted as a camera 206), and at least one processor (depicted as a processor 208). The processor 208 is communicably coupled to the light source 202, the plurality of illuminators 204, and the camera 206.

It may be understood by a person skilled in the art that FIG. 2 includes a simplified architecture of the display apparatus 200 for sake of clarity, which should not unduly limit the scope of the claims herein. The person skilled in the art will recognize many variations, alternatives, and modifications of embodiments of the present disclosure. As an example, the display apparatus 200 may further comprise an exit optical element per eye.

Figure 3A:
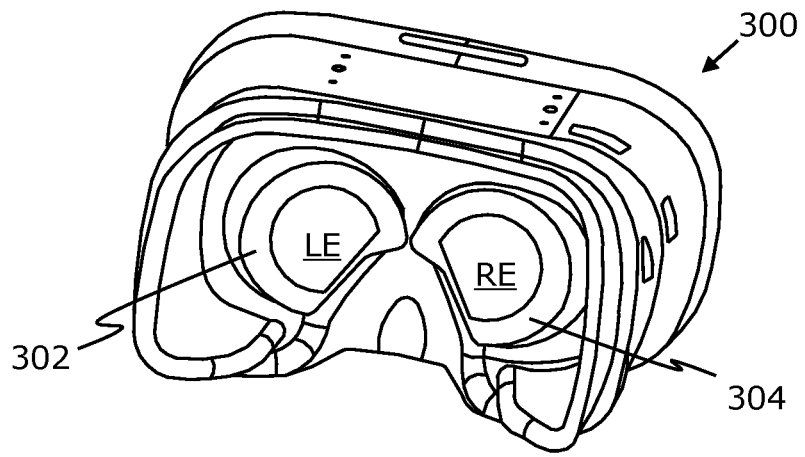
FIG. 3A illustrates a schematic illustration of an exemplary head-mounted display apparatus, in accordance with an embodiment of the present disclosure.

Referring to FIG. 3A, illustrated is a schematic illustration of an exemplary head-mounted display apparatus 300, in accordance with an embodiment of the present disclosure. The head-mounted display apparatus 300, in operation, is worn by a user. The head-mounted display apparatus 300 is shown to comprise an exit optical element 302 for a left eye (LE) of the user and an exit optical element 304 for a right eye (RE) of the user.

Figure 3B:
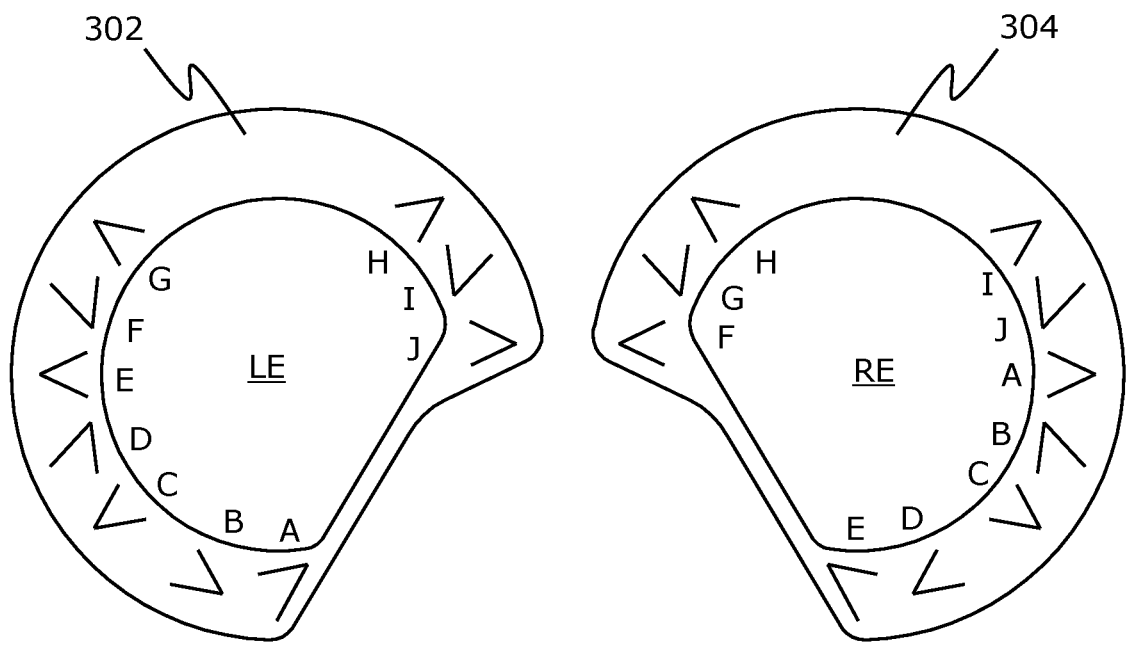
FIG. 3B illustrates a schematic illustration of exit optical elements of the head-mounted display apparatus of FIG. 3A, in accordance with an embodiment of the present disclosure.

Referring to FIG. 3B, illustrated is a schematic illustration of the exit optical elements 302 and 304 of the head-mounted display apparatus 300 of FIG. 3A, in accordance with an embodiment of the present disclosure. As shown, 10 illuminators A, B, C, D, E, F, G, H, I and J are arranged around a periphery of the exit optical elements 302 and 304 along a circular arc. Each illuminator has a V shape that is symmetrical about only one axis and that has rotational uniqueness about 360 degrees. Moreover, the 10 illuminators A, B, C, D, E, F, G, H, I and J are depicted to have different rotational orientations and positions. Here, the "rotational orientation" of a given illuminator refers to a direction where a tip of the V shape of the given illuminator is pointing, and the "position" of the given illuminator refers to an angle [0, 360] at which the given illuminator is positioned on a circular rim of the exit optical elements 302 and 304, as measured from a centre of said circular rim. As an example, in case of orientation, ">" corresponds to a 0 degree angle, "<" corresponds to a 180 degrees angle, and so forth.

Figure 3C:
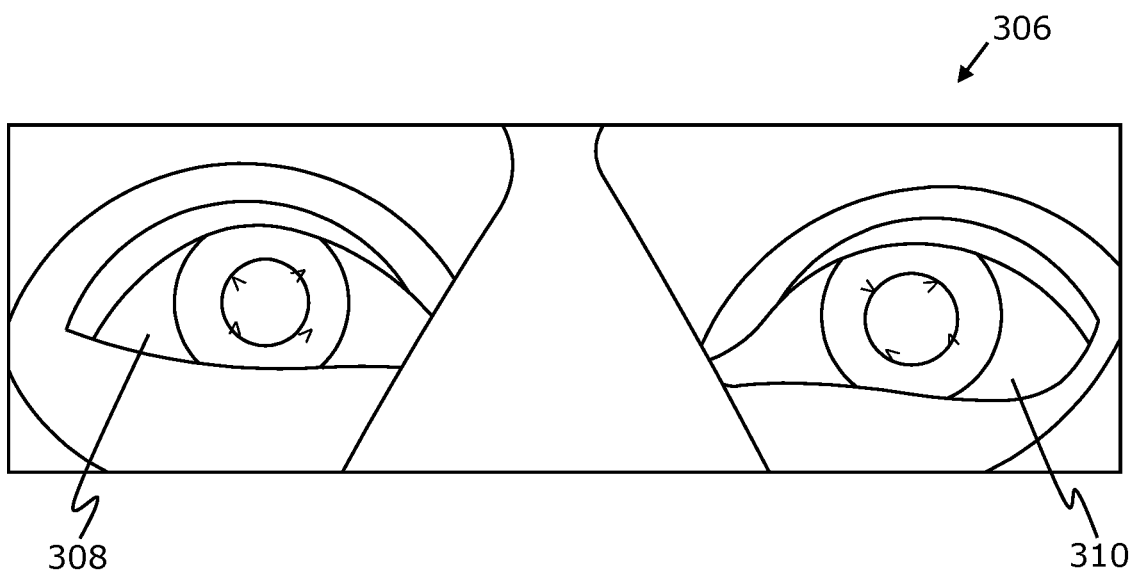
FIG. 3C illustrates a schematic illustration of an exemplary eye image of a user's eyes and reflections of four illuminators from a user's eyes, in accordance with an embodiment of the present disclosure.

Referring to FIG. 3C, illustrated is a schematic illustration of an exemplary eye image 306 of a user's eyes 308 and 310 and reflections of four illuminators from the user's eyes 308 and 310, in accordance with an embodiment of the present disclosure. By way of the eye image 306, the reflections of the four illuminators are employed to detect a gaze direction of the user, when the four illuminators are illuminated simultaneously. The four illuminators are selected from amongst the 10 illuminators A, B, C, D, E, F, G, H, I and J, based on user-specific scores computed for the plurality of illuminators.

Figure 3D:
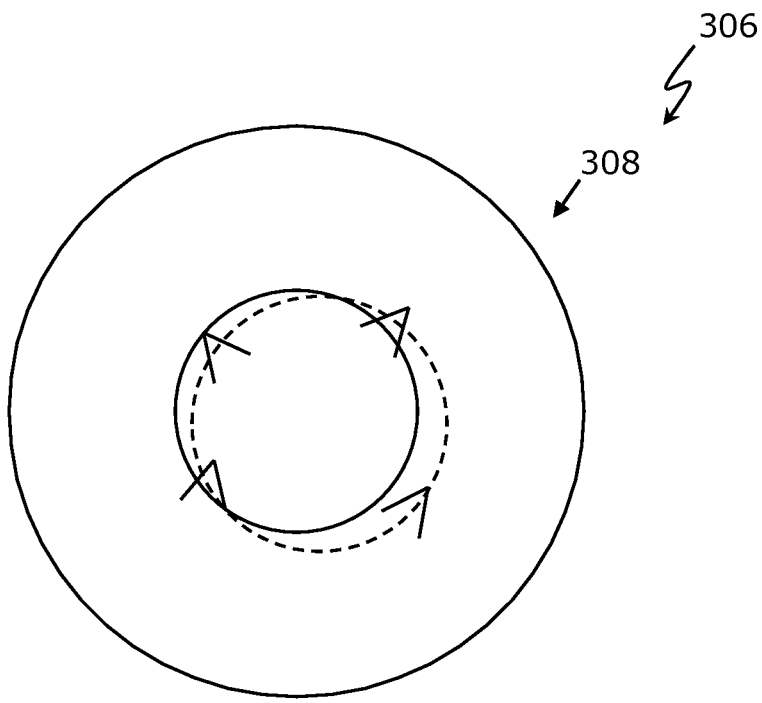
FIGS. 3D and 3E illustrate zoomed-in views of the eye image of FIG. 3C depicting reflections of four illuminators from the user's eye, in accordance with an embodiment of the present disclosure.
Figure 3E:
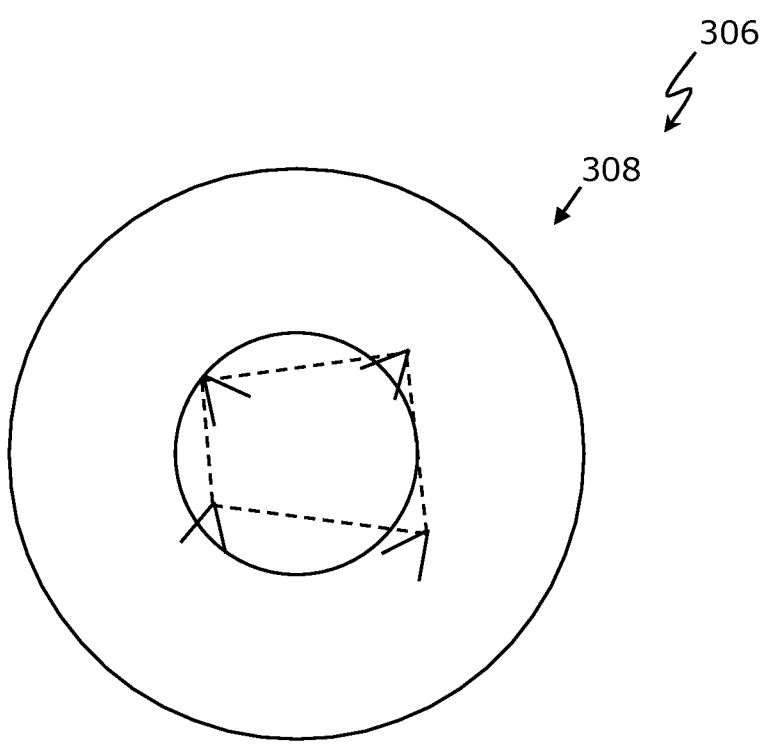

Referring to FIGS. 3D and 3E, illustrated are zoomed-in views of the eye image 306 depicting reflections of four illuminators from the user's eye 308, in accordance with an embodiment of the present disclosure. In FIGS. 3D and 3E, the reflections of the four illuminators (selected from amongst the 10 illuminators of FIG. 3B) from the user's eye 308 appear as four reflections (namely, glints).

In FIG. 3D, since the four illuminators are arranged along a circular arc (depicted in FIG. 3B), the four reflections are also shown to be arranged along a circular arc. A dashed circle is shown to approximate a shape of the circular arc corresponding to the arrangement of the four reflections.

In FIG. 3E, the four reflections define a polygon (depicted as a dashed polygon). A processor (not shown) of a gaze-tracking system (not shown) is configured to identify the polygon defined by the four reflections of the four illuminators, and to determine a relative position of a user's pupil with respect to the polygon.

Figure 4:
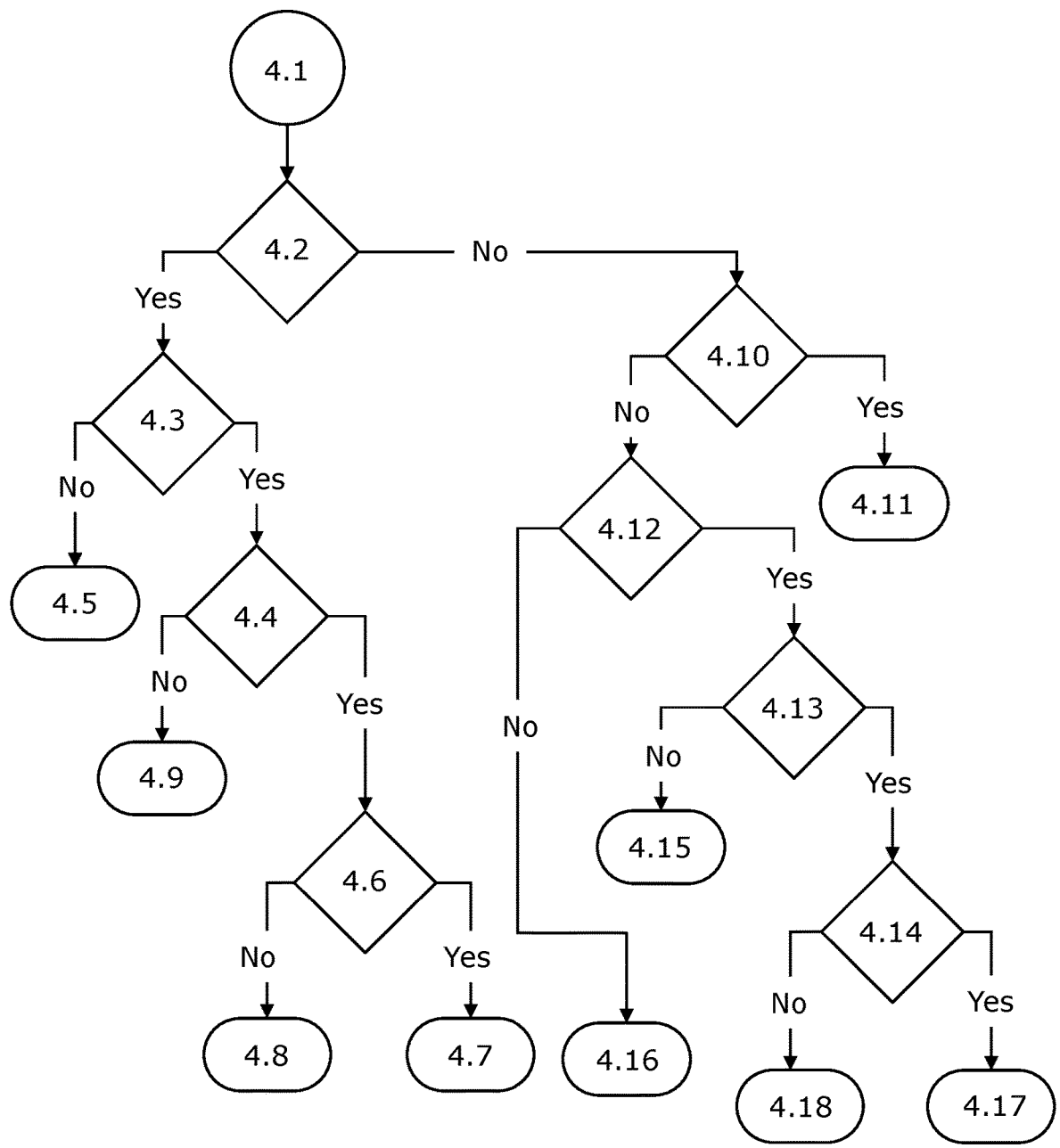
FIG. 4 illustrates a process flow of a gaze-tracking method performed by at least one processor of a gaze-tracking system, in accordance with an embodiment of the present disclosure.

Referring to FIG. 4, illustrated is a process flow of a gaze-tracking method performed by at least one processor of a gaze-tracking system, in accordance with an embodiment of the present disclosure. At step 4.1, an eye image of a user's eye is captured by at least one camera. At step 4.2, it is checked if more than one illuminator was illuminated while capturing the eye image. In one case, when more than one illuminator are illuminated, the eye image depicts reflections of more than one illuminator, then at step 4.3, it is checked if a pupil of the user's eye is visible in the eye image. If yes, then at step 4.4, it is checked if a sweep (namely, a cycle) of illumination of all illuminators amongst a plurality of illuminators is completed. If no, then at step 4.5, the at least one processor is configured to halt operation and restart the method. When the sweep of illumination of all the illuminators is completed (at step 4.4), then at step 4.6, it is checked if there has been a change in position (namely, a movement) of the pupil of the user's eye. If yes, then at step 4.7, the at least one processor is configured to halt operation and restart the method. If no, at step 4.8, the at least one processor is configured to select at least one illuminator from amongst a plurality of illuminators. When the sweep of illumination of respective illuminators is not completed (at step 4.4), then at step 4.9, the at least one processor is configured to collect information pertaining to features of the user's eye. In another case, when only one illuminator is illuminated, the eye image depicts a single reflection of said illuminator, then at step 4.10, it is checked whether there exists a given eye image depicting the single reflection of said illuminator. If yes, then at step 4.11, the at least one processor is configured to halt operation and restart the method. If no, then at step 4.12, it is checked if all required eye images for stacking are available. If yes, then at step 4.13, it is checked if the pupil of the user's eye is visible in the required eye images for stacking. If yes, then at step 4.14, it is checked if there has occurred a change in position of the pupil of the user's eye in the required eye images for stacking. If no, then at step 4.15, the at least one processor is configured to halt operation and restart the method. When all the required eye images for stacking are not available (at step 4.12), then at step 4.16, the at least one processor is configured to store the required eye images and continue. When there occurs a change in position of the pupil of the user's eye (at step 4.14), then at step 4.17, the at least one processor is configured to halt operation and restart the method. When there does not occur a change in position of the pupil of the user's eye (at step 4.14), then at step 4.18, the at least one processor is configured to store the required eye images and continue.

Figure 5A:
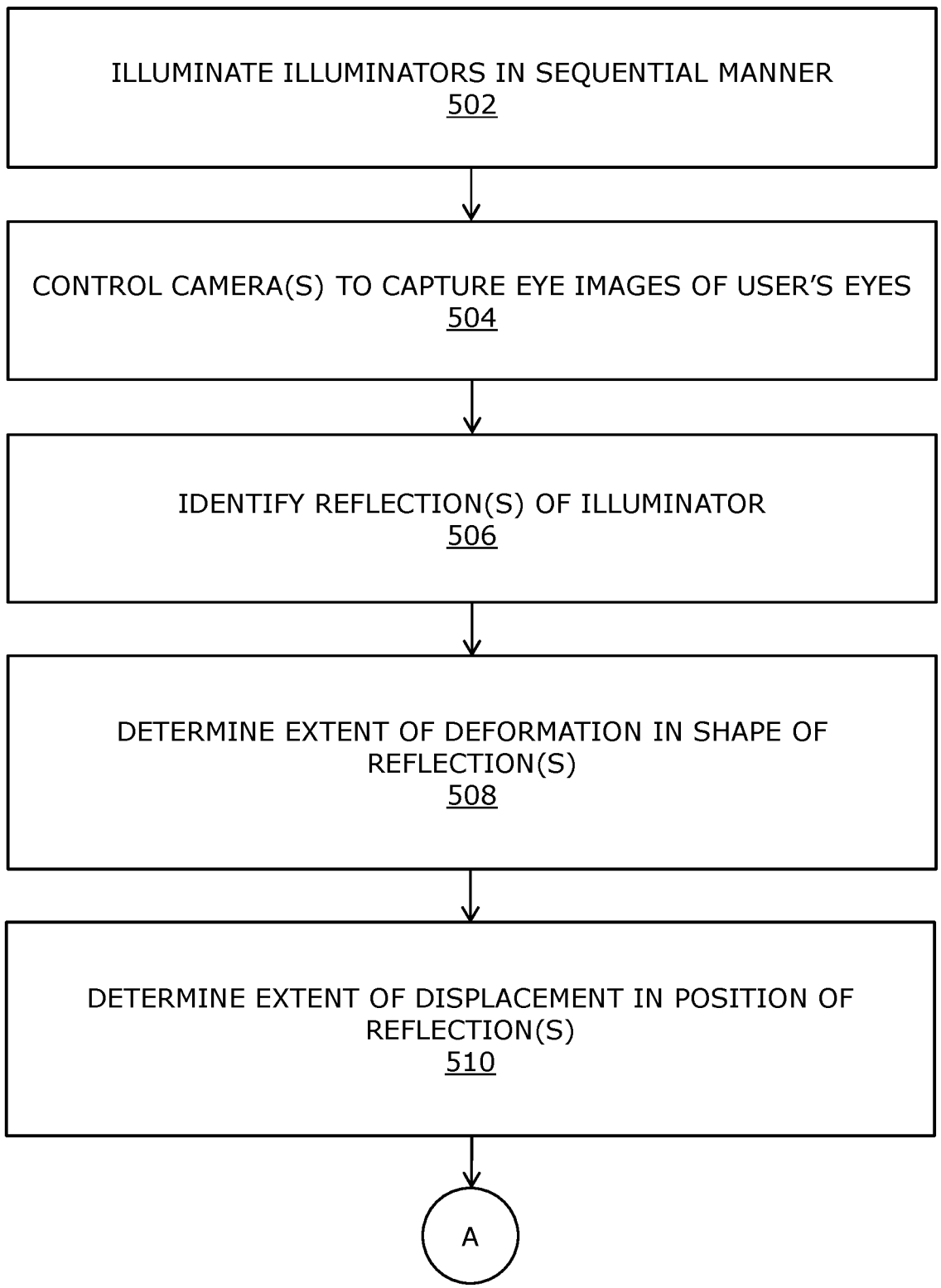
FIGS. 5A and 5B illustrate steps of a gaze-tracking method, in accordance with an embodiment of the present disclosure.
Figure 5B:
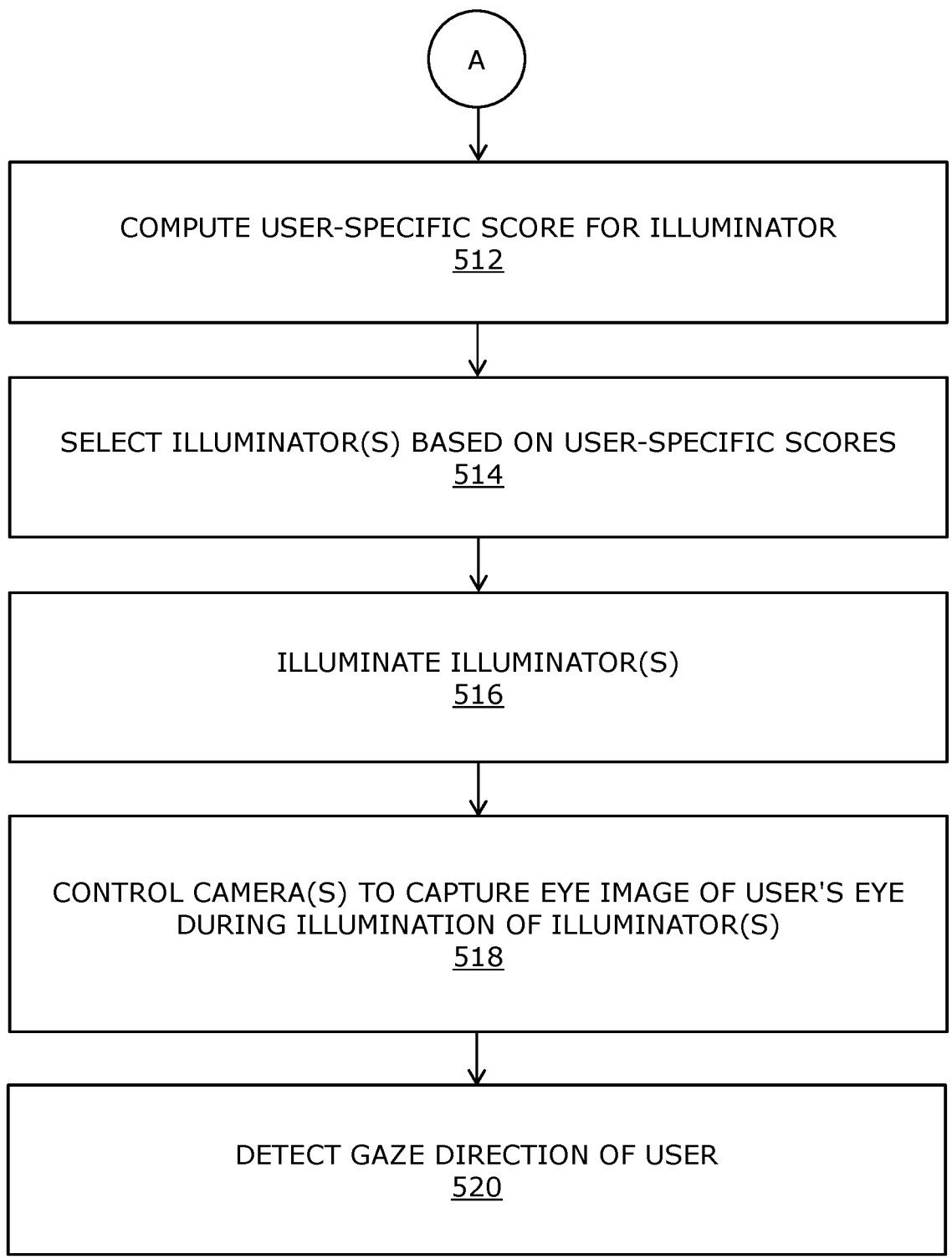

Referring to FIGS. 5A and 5B, illustrated are steps of a gaze-tracking method, in accordance with an embodiment of the present disclosure. At step 502, a plurality of illuminators are illuminated in a sequential manner, wherein a single illuminator is illuminated at a given instant of time. At step 504, at least one camera is controlled to capture a plurality of eye images of a user's eye during illumination of respective illuminators. At step 506, at least one reflection of a given illuminator that is visible in a corresponding eye image is identified. At step 508, an extent of deformation in a shape of the at least one reflection with respect to a shape of the given illuminator is determined. At step 510, an extent of displacement in a position of the at least one reflection relative to the user's eye as captured in the corresponding eye image with respect to a position of the given illuminator relative to the user's eye, is determined. At step 512, a user-specific score is computed for the given illuminator based on the extent of deformation and the extent of displacement. At step 514, at least one illuminator is selected from amongst the plurality of illuminators based on user-specific scores computed for the plurality of illuminators. At step 516, the at least one illuminator is illuminated. At step 518, the at least one camera is controlled to capture an eye image of the user's eye during illumination of the at least one illuminator. At step 520, a gaze direction of the user is detected based upon a relative position of a pupil of the user's eye with respect to reflections of the at least one illuminator in the eye image.

The steps 502, 504, 506, 508, 510, 512, 514, 516, 518, and 520 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A gaze-tracking system for use in a head-mounted display apparatus, the gaze-tracking system comprising:
   a plurality of illuminators;
   at least one camera; and
   at least one processor configured to:
      illuminate the plurality of illuminators in a sequential manner, wherein a single illuminator is illuminated at a given instant of time;
      control the at least one camera to capture a plurality of eye images of a user's eye during illumination of respective illuminators;
      identify at least one reflection of a given illuminator that is visible in a corresponding eye image;
      determine an extent of deformation in a shape of the at least one reflection with respect to a shape of the given illuminator;
      determine an extent of displacement in a position of the at least one reflection relative to the user's eye as captured in the corresponding eye image with respect to a position of the given illuminator relative to the user's eye;
      compute a user-specific score for the given illuminator based on the extent of deformation and the extent of displacement;
      select at least one illuminator from amongst the plurality of illuminators based on user-specific scores computed for the plurality of illuminators;
      illuminate the at least one illuminator;
      control the at least one camera to capture an eye image of the user's eye during illumination of the at least one illuminator; and
      detect a gaze direction of the user based upon a relative position of a pupil of the user's eye with respect to reflections of the at least one illuminator in the eye image;
      wherein the plurality of illuminators are arranged along a circular arc, the at least one illuminator comprising more than one illuminator, and wherein the reflections of the at least one illuminator are arranged along a circular arc; and
      wherein the at least one processor is configured to:
         identify a polygon defined by the reflections of the at least one illuminator; and
         determine the relative position of the user's pupil with respect to the polygon.

2. The gaze-tracking system of claim 1, wherein the plurality of illuminators are non-circular in shape, and wherein the at least one processor is configured to:
   determine an extent of angular displacement in a rotational orientation of the at least one reflection with respect to a rotational orientation of the given illuminator; and
   compute the user-specific score for the given illuminator based on the extent of angular displacement.

3. The gaze-tracking system of claim 1, wherein the at least one processor is configured to determine an extent of occlusion of the pupil of the user's eye by the at least one reflection caused by the given illuminator, and compute the user-specific score for the given illuminator based also on the extent of occlusion.

4. A gaze-tracking method comprising:
   illuminating a plurality of illuminators in a sequential manner, wherein a single illuminator is illuminated at a given instant of time;
   controlling at least one camera to capture a plurality of eye images of a user's eye during illumination of respective illuminators;
   identifying at least one reflection of a given illuminator that is visible in a corresponding eye image;
   determining an extent of deformation in a shape of the at least one reflection with respect to a shape of the given illuminator;
   determining an extent of displacement in a position of the at least one reflection relative to the user's eye as captured in the corresponding eye image with respect to a position of the given illuminator relative to the user's eye;

computing a user-specific score for the given illuminator based on the extent of deformation and the extent of displacement;

selecting at least one illuminator from amongst the plurality of illuminators based on user-specific scores computed for the plurality of illuminators;

illuminating the at least one illuminator;

controlling the at least one camera to capture an eye image of the user's eye during illumination of the at least one illuminator; and detecting a gaze direction of the user based upon a relative position of a pupil of the user's eye with respect to reflections of the at least one illuminator in the eye image;

wherein the plurality of illuminators are arranged along a circular arc, the at least one illuminator comprising more than one illuminator, and wherein the reflections of the at least one illuminator are arranged along a circular arc; and wherein the at least one processor is configured to:
identify a polygon defined by the reflections of the at least one illuminator; and
determine the relative position of the user's pupil with respect to the polygon.

5. The gaze-tracking method of claim 4, wherein the plurality of illuminators are non-circular in shape, the method further comprising determining an extent of angular displacement in a rotational orientation of the at least one reflection with respect to a rotational orientation of the given illuminator, wherein the step of computing the user-specific score for the given illuminator is performed based on the extent of angular displacement.

6. The gaze-tracking method of claim 4, further comprising determining an extent of occlusion of the pupil of the user's eye by the at least one reflection caused by the given illuminator, and computing the user-specific score for the given illuminator based also on the extent of occlusion.

7. A display apparatus comprising:
at least one light source that is to be employed to display images to a user;
a plurality of illuminators;
at least one camera; and
at least one processor configured to:
illuminate the plurality of illuminators in a sequential manner, wherein a single illuminator is illuminated at a given instant of time;
control the at least one camera to capture a plurality of eye images of a user's eye during illumination of respective illuminators;
identify at least one reflection of a given illuminator that is visible in a corresponding eye image;
determine an extent of deformation in a shape of the at least one reflection with respect to a shape of the given illuminator;
determine an extent of displacement in a position of the at least one reflection relative to the user's eye as captured in the corresponding eye image with respect to a position of the given illuminator relative to the user's eye;
compute a user-specific score for the given illuminator based on the extent of deformation and the extent of displacement;
select at least one illuminator from amongst the plurality of illuminators based on user-specific scores computed for the plurality of illuminators;
illuminate the at least one illuminator;
control the at least one camera to capture an eye image of the user's eye during illumination of the at least one illuminator; and
detect a gaze direction of the user based upon a relative position of a pupil of the user's eye with respect to reflections of the at least one illuminator in the eye image;
wherein the plurality of illuminators are arranged along a circular arc, the at least one illuminator comprising more than one illuminator, and wherein the reflections of the at least one illuminator are arranged along a circular arc; and
wherein the at least one processor is configured to:
identify a polygon defined by the reflections of the at least one illuminator; and
determine the relative position of the user's pupil with respect to the polygon.

8. The display apparatus of claim 7, wherein the plurality of illuminators are non-circular in shape, and wherein the at least one processor is configured to:
determine an extent of angular displacement in a rotational orientation of the at least one reflection with respect to a rotational orientation of the given illuminator; and
compute the user-specific score for the given illuminator based on the extent of angular displacement.

9. The display apparatus of claim 7, wherein the at least one processor is configured to determine an extent of occlusion of the pupil of the user's eye by the at least one reflection caused by the given illuminator, and compute the user-specific score for the given illuminator based also on the extent of occlusion.

10. The display apparatus of claim 7, further comprising an exit optical element, wherein the plurality of illuminators are arranged around a periphery of the exit optical element.

* * * * *